(12) United States Patent
Perrin, III

(10) Patent No.: US 11,528,790 B2
(45) Date of Patent: Dec. 13, 2022

(54) SYSTEM AND METHOD FOR REPURPOSING 120VAC WIRING ARCHITECTURE TO RETROFITABLE LOW VOLTAGE DC POWER 2-WIRE LED DIMMING

(71) Applicant: EPRAD, INC., Perrysburg, OH (US)

(72) Inventor: James B. Perrin, III, Swanton, OH (US)

(73) Assignee: EPRAD, Inc., Perrysburg, OH (US)

( * ) Notice: Subject to any disclaimer, the term of this patent is extended or adjusted under 35 U.S.C. 154(b) by 0 days.

(21) Appl. No.: 17/287,557

(22) PCT Filed: Oct. 24, 2019

(86) PCT No.: PCT/US2019/057845
§ 371 (c)(1),
(2) Date: Apr. 22, 2021

(87) PCT Pub. No.: WO2020/086836
PCT Pub. Date: Apr. 30, 2020

(65) Prior Publication Data
US 2021/0345463 A1 Nov. 4, 2021

Related U.S. Application Data

(60) Provisional application No. 62/750,027, filed on Oct. 24, 2018.

(51) Int. Cl.
*H05B 45/30* (2020.01)
*H05B 45/3577* (2020.01)
(Continued)

(52) U.S. Cl.
CPC ....... *H05B 45/3577* (2020.01); *H05B 45/325* (2020.01); *H05B 47/24* (2020.01)

(58) Field of Classification Search
CPC .... H05B 45/30; H05B 45/325; H05B 45/355; H05B 45/395; H05B 45/3725
See application file for complete search history.

(56) References Cited

U.S. PATENT DOCUMENTS 8,368,322 B2    2/2013   Yu et al.
8,456,108 B2 *   6/2013   Kimura ................ H05B 45/385
                                                                          315/307
(Continued)

FOREIGN PATENT DOCUMENTS

WO     2012158498 A2    11/2012

OTHER PUBLICATIONS

U.S. Patent and Trademark Office, International Search Report with Written Opinion, issued in PCT/US2019/057845, dated Dec. 23, 2019, 9 pages, U.S. Patent and Trademark Office, Alexandria, Virginia USA.

*Primary Examiner* — Tung X Le
(74) *Attorney, Agent, or Firm* — Marshall & Melhorn, LLC

(57) ABSTRACT

A 2-Wire LED dimming system and method re-purposes existing 120V AC architecture and hardware to carry low voltage PWM gradient DC power to the LED lamps provides a consistent gradation over a 0-100% dimming range. An LED Driver is electrically connected to an AC power source and connect to at least one LED lamp. The AC power source is electrically connected to an AC to DC converter where the AC power is converted to filtered and regulated DC power for the control unit and the power switch. The power switch is electrically connected to the AC to DC converter DC power output. The control unit is electrically connected to the power switch which is turned ON or OFF according to the pulse width modulation PWM signal from (Continued)

the control unit in order to connect or disconnect the DC power from the AC to DC converter.

8 Claims, 2 Drawing Sheets

(51) Int. Cl.
    *H05B 47/24*     (2020.01)
    *H05B 45/325*     (2020.01)

(56) References Cited

U.S. PATENT DOCUMENTS

| | | |
|---|---|---|
| 8,558,482 B2 | 10/2013 | Chu |
| 8,698,407 B1 * | 4/2014 | Chen .................... H05B 45/395 |
| | | 315/193 |
| 9,706,613 B2 | 7/2017 | Gibbs |
| 2011/0121744 A1 * | 5/2011 | Salvestrini ............ H02M 1/082 |
| | | 315/246 |
| 2011/0193491 A1 * | 8/2011 | Choutov .............. H05B 45/325 |
| | | 315/291 |
| 2012/0212151 A1 | 8/2012 | Chu |
| 2013/0193879 A1 * | 8/2013 | Sadwick .............. H05B 45/385 |
| | | 315/307 |
| 2014/0265844 A1 | 9/2014 | Sadwick et al. |
| 2014/0265898 A1 | 9/2014 | Del Carmen, Jr. et al. |
| 2014/0320031 A1 * | 10/2014 | Wu ........................ H05B 45/10 |
| | | 315/193 |
| 2017/0223795 A1 | 8/2017 | Sadwick et al. |

* cited by examiner

SYSTEM AND METHOD FOR REPURPOSING 120VAC WIRING ARCHITECTURE TO RETROFITABLE LOW VOLTAGE DC POWER 2-WIRE LED DIMMING

CROSS-REFERENCE TO RELATED APPLICATION

The present application claims the benefit to U.S. Provisional Patent Application No. 62/750,027 filed on Oct. 24, 2018, which is incorporated herein by reference in its entirety.

FIELD OF THE INVENTION

The invention relates to LED dimming in environments requiring expansive and precise dimming gradation and, more particularly, to a system and method for re-purposing existing 120 VAC load wiring architecture and fixtures through the deployment of low voltage PWM power. This invention embodies a means to ameliorate conditions indicative of series voltage drop, eliminate "drop-out," "pop-on" and flicker conditions, thus providing to the user a desired lighting scene ranging from zero light to 100% brightness in precise gradations.

BACKGROUND OF THE INVENTION

Existing retrofit (screw-in) LED lamps designed to be dimmed by phase cut or sine wave dimmers do not provide a full range of gradient dimming required for precise premise applications such as theatre auditoriums. The present state of commercially available technologies typically dims down to a range of, about, 5-15%, exhibiting both pop-on and drop-out manifestations at the low end of gradient dimming. In many examples of the current state of the art, the pop-on and drop-out thresholds vary dramatically between lamps, resulting in inconsistent low-end gradient performance, where some lamps exhibit zero light while others on the circuit remain on and are known to flicker at such low-end dimming conditions. Known systems utilize lamps containing a driver circuit that must convert the sine-wave or phase-cut AC power from the dimmer to a signal suitable for the LED(s), which presents a challenge for the driver circuit, particularly at low gradation levels or narrow conduction angles, resulting in low gradient performance deterioration.

It would be advantageous to develop a 2-Wire LED dimming system and method which re-purposes existing 120 VAC architecture and hardware to carry low voltage PWM gradient DC power to the LED lamps as opposed to the inconsistent gradation provided through current DC dimming or AC mains dimming power technologies.

SUMMARY OF THE INVENTION

The invention disclosed herein overcomes the problems described above. The power delivered to the lamps is directly usable by the LED(s), thus, no signal conversion is required by the lamps. The LED(s) in all lamps on the circuit receive the same signal from an external driver. The current commercially available lamps respond well to very short on-time PWM signals. This allows for a very high dimming ratio and consistent low-level gradient performance not achievable by designs with integrated drivers. The present invention provides a system and method for Low Power PWM dimming of at least one LED lamp in a circuit previously built and designed to carry 120 VAC power. This invention ameliorates conditions indicative of series voltage drop, and can eliminate "drop-out," "pop-on" and flicker conditions, thus providing to the user a desired lighting scene ranging from zero light to 100% brightness in precise gradations, incorporating supply-chopped dimming circuitry utilizing a driver providing PWM power and control signal, such driver and lamp being divided into separate units with one driver controlling many lamps over no more than 2 wires. The driver contains a power factor corrected, filtered and regulated DC power supply that provides power to the control circuitry as well as the lamp(s), thus resulting in consistent brightness by and between lamps at all power levels.

In a preferred embodiment, the present invention is directed to a theatre auditorium lighting scheme comprised of 120 volt alternating current wiring architecture and fixtures which were originally designed for use with incandescent bulbs, which, while less expensive than LED lamps, require frequent replacement, excessive power consumption and a committed staff of bulb replacement personnel, among other things. The 2-wire Low Power DC LED Dimming System comprises an LED Driver, which is electrically connected to an AC power source. The LED driver output terminals electrically connect to at least one LED lamp. The AC power source is electrically connected to an AC to DC converter where the AC power is converted to filtered and regulated DC power for the control unit and the power switch. The power switch is electrically connected to the AC to DC converter DC power output. The control unit is electrically connected to the power switch. The power switch is turned ON or OFF according to the pulse width modulation PWM signal from the control unit in order to connect or disconnect the DC power from the AC to DC converter to the positive output terminal LED+ of the LED driver. In a preferred embodiment, the power switch may be implemented with a P-type metal-oxide semiconductor (PMOS), in which the gate terminal of the PMOS is connected to the control unit, the drain terminal on the PMOS is connected to the positive output terminal LED+ and the source terminal of the PMOS is connected to the AC to DC converter voltage. However, such a configuration is not meant to limit the power switch of the present embodiment. The power switch could be implemented with either a PMOS, NMOS or bipolar transistor as either a high-side, low-side or push-pull type switch to connect or disconnect the output terminal LED+ of the LED driver.

The control unit is configured to receive external control signal CMD via wired or wireless connection and adjust the duty cycle of the pulse width modulated PWM signal according to the control commands.

The control unit monitors voltage from the AC to DC converter to provide over and under voltage protection to the LED lamp(s). The control unit monitors the LED-return current to provide short circuit and over-load protection for the LED driver. If the control unit detects any of these conditions, it turns OFF the power switch, disconnecting it from the LED lamp(s).

The control unit is also configured to monitor the control signal from the dimming angle sensing unit and adjust the duty cycle of the pulse width modulated PWM signal. The dimming angle sensing unit provides an optional control interface for traditional AC mains phase-cut dimmers.

The LED lamp input terminals electrically connect to single LED driver terminals.

The input terminals are electrically connected to the input over-voltage protection unit. The input over-voltage protection unit is a bi-directional crowbar circuit that prevents damage to the LED lamp circuits from an accidental over-voltage condition. In the event of an over-voltage condition, the bi-directional thyristor switches ON providing a low resistance path between input terminals. The excessive current causes a fuse to open interrupting power to the lamp.

The rectifier circuit is electrically connected to the protected side of a fuse and LED lamp input terminal. The rectifier circuit is configured to convert the PWM input power at terminals of either polarity to the correct polarity required by the LED module and the lamp circuits. For example, in the present embodiment, the rectifier circuit may be implemented by a bridge rectifier including diodes, in which the cathode terminals of the diodes are electrically connected to the anode terminal of the LED module, and the anode terminals of the diodes are electrically connected to the LED power return. The rectifier circuit may be implemented in a variety of ways, and the use of a bridge rectifier is not meant to limit the present disclosure.

The LED module anode terminal is electrically connected to the V+ terminal of the rectifier circuit diodes cathode terminals. The LED module cathode terminal is electrically connected to the current regulator input terminal. In an embodiment of the present disclosure, the LED module can be comprised of, but not limited to, SMD (Surface Mount Device) LEDs in a series, parallel or series-parallel arrangement or LED COB (Chip On Board) module.

The current regulator is electrically connected to the LED module cathode terminal. The rectifier circuit terminals are electrically connected to the current regulator. The current regulator provides a fixed (constant) current to the LED module. The current regulator may be implemented with a constant current sink. LED voltage is converted to current by a resistor to provide base current to the transistor current amplifier. An error amplifier and transistor operate to maintain a fixed voltage across an LED current limiting resistor. The inverting input is configured to receive a voltage reference. The non-inverting input of the error amplifier is configured to receive a transistor emitter voltage. Error voltage at the input will result in a corresponding increasing or decreasing current at the output terminal, which drives the base of a transistor. The transistor will shunt more or less base current to maintain a fixed voltage that is equal to the reference voltage. Voltage across a resistor determines the LED current. The current regulator may be implemented in a variety of ways, and the constant current sink is not meant to limit the present disclosure.

The shutdown switch is electrically connected to an LED module cathode terminal and the rectifier circuit terminal. The voltage detection unit monitors the voltage between the LED module cathode terminal and V−. The shutdown switch is electrically connected to the base of a transistor. In the present embodiment, a switch is implemented with an N-type metal-oxide semiconductor (NMOS), in which the gate terminal is connected to the voltage detection unit, the drain terminal is connected to the base terminal and the source terminal is connected to the V− terminal of the rectifier circuit. The voltage detection unit is configured to turn ON the switch when the voltage at the LED module cathode terminal exceeds a predetermined level. This interrupts the current flow to the current regulator, protecting it in the event of an LED module short circuit or excessive input voltage.

Various aspects of this invention will become apparent to those skilled in the art from the following detailed description of the preferred embodiment, when read in light of the accompanying drawings.

DETAILED DESCRIPTION OF THE INVENTION

Figure 1:
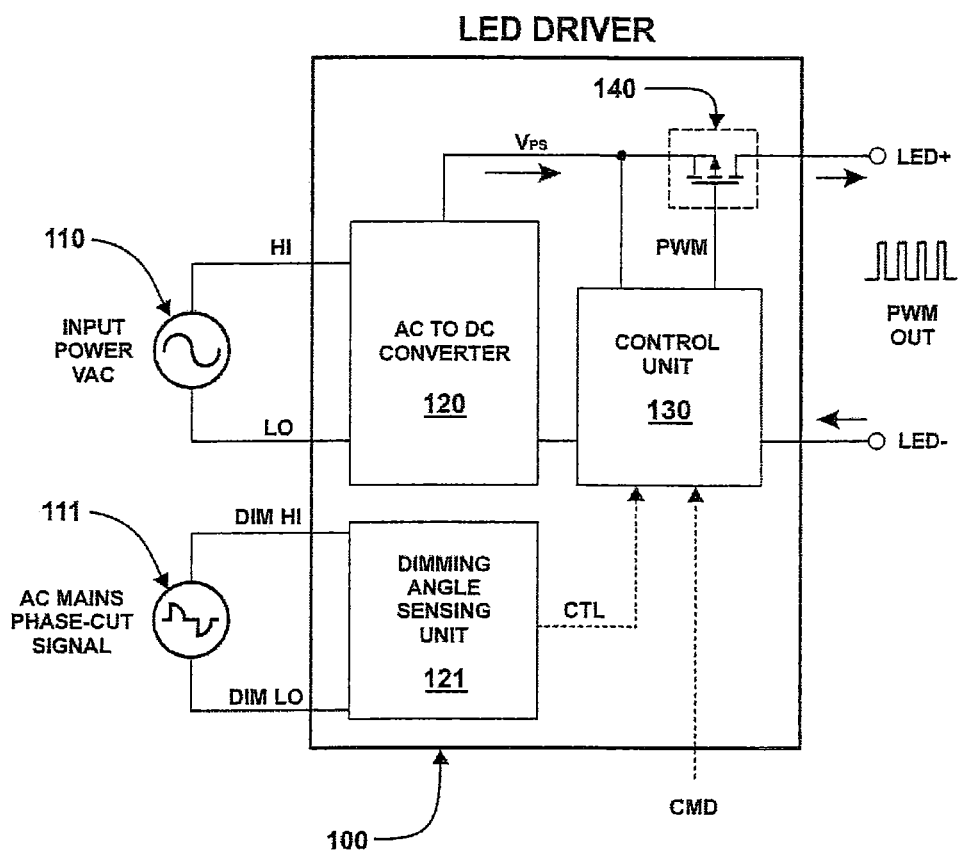
FIG. 1 shows a schematic view of an LED driver according to an embodiment of the present invention.

FIG. 1 shows LED driver 100 which is electrically connected to an AC power source 110. The LED driver 100 output terminals LED+ and LED− electrically connect to a plurality of LED lamps 150 as described in FIG. 2. The AC power source 110 is electrically connected to the AC to DC converter 120 where the AC power is converted to filtered and regulated DC power $V_{PS}$ for the control unit 130 and the power switch 140.

The power switch 140 is electrically connected to the AC to DC converter 120 DC power output $V_{PS}$. The control unit 130 is electrically connected to the power switch 140. The power switch 140 is turned ON or OFF according to the pulse width modulation PWM signal from the control unit 130 in order to connect or disconnect the DC power ($V_{PS}$) from the AC to DC converter 120 to the positive output terminal LED+ of the LED driver 100. In the present disclosure, the power switch 140 may be implemented with a P-type metal-oxide semiconductor (PMOS), in which the gate terminal of the PMOS is connected to the control unit 130, the drain terminal on the PMOS is connected to the positive output terminal LED+ and the source terminal of the PMOS is connected to the AC to DC converter voltage $V_{PS}$. However, such a configuration is not meant to limit the power switch 140 of the present disclosure. The power switch 140 could be implemented with either a PMOS, NMOS or bipolar transistor as either a high-side, low-side or push-pull type switch to connect or disconnect the output terminal LED+ of the LED driver 100.

The control unit 130 is configured to receive external control signal CMD via wired or wireless connection and adjust the duty cycle of the pulse width modulated PWM signal according to the control commands.

The control unit 130 monitors voltage $V_{PS}$ from the AC to DC converter 120 to provide over and under voltage protection to the LED lamps. The control unit 130 monitors the LED− return current to provide short circuit and over-load protection for the LED driver 100. If the control unit 130 detects any of these conditions, it turns OFF the power switch 140 disconnecting it from the LED lamp(s) 150.

The control unit 130 is also configured to receive control signal CTL from the dimming angle sensing unit 121 and adjust the duty cycle of the pulse width modulated PWM signal accordingly. The dimming angle sensing unit 121 can be electrically connected to an AC mains forward or reverse phase cut signal 111 generated by an external dimmer unit. The dimming angle sensing unit 121 generates the electrically isolated low voltage control signal CTL corresponding to the conduction angle of the phase cut signal 111.

Figure 2:
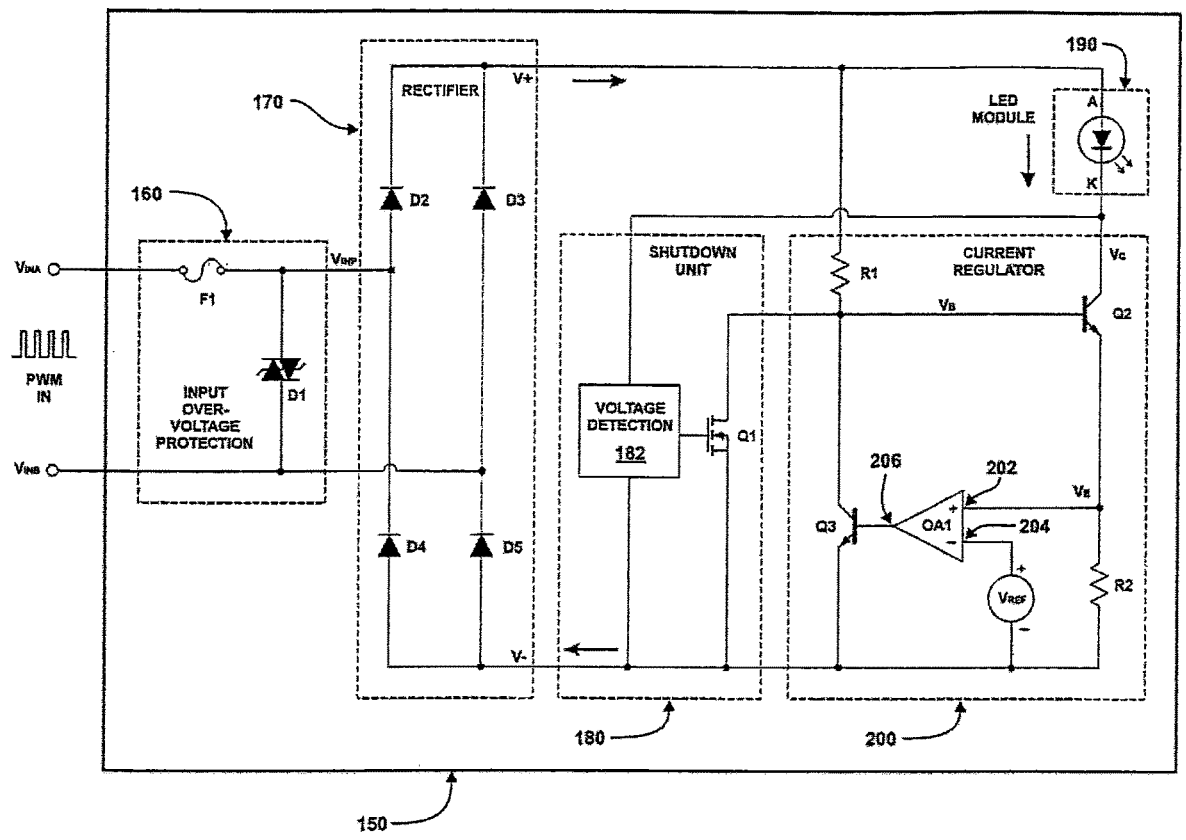
FIG. 2 shows a schematic view of an LED lamp according to an embodiment of the present invention.

FIG. 2 shows an embodiment of an LED lamp 150. The LED lamp 150 input terminals $V_{INA}$ and $V_{INB}$ electrically connect to a single LED driver 100 terminals LED+ and LED− in shown in FIG. 1.

The input terminals $V_{INA}$ and $V_{INB}$ are electrically connected to the input over-voltage protection unit 160. The input over-voltage protection unit 160 is a bi-directional crowbar circuit that prevents damage to the LED lamp 150 circuits from an accidental over-voltage condition. In the event of an over-voltage condition, the bi-directional thyristor D1 switches ON providing a low resistance path between input terminals $V_{INA}$ and $V_{INB}$. The excessive current causes the fuse F1 to open interrupting power to the lamp.

The rectifier circuit 170 is electrically connected to the protected side ($V_{INP}$) of fuse F1 and LED lamp 150 input terminal $V_{INB}$. The rectifier circuit 170 is configured to convert the PWM input power at terminals $V_{INA}$ and $V_{INB}$ of either polarity to the correct polarity required by the LED module 190 and the lamp circuits. For example, in one embodiment, the rectifier circuit 170 may be implemented by a bridge rectifier including diodes D2, D3, D4, and D5, in which the cathode terminals of the diodes D2 and D3 are electrically connected to the anode terminal A of the LED module 190, and the anode terminals of the diodes D4 and D5 are electrically connected to the LED power return V−. Note that the rectifier circuit 170 may be implemented in a variety of ways, and the bridge rectifier illustrated in FIG. 2 is only an example and not meant to limit the present disclosure.

The LED module 190 anode terminal A is electrically connected to the V+ terminal of the rectifier circuit 170 diodes D2 and D3 cathode terminals. The LED module 190 cathode terminal K is electrically connected to the current regulator input terminal $V_C$. In an embodiment of the present disclosure, the LED module 190 can be comprised of, but not limited to, SMD (Surface Mount Device) LEDs in a series, parallel or series-parallel arrangement or LED COB (Chip On Board) module.

The current regulator 200 is electrically connected to the LED module 190 cathode terminal K. The rectifier circuit 170 terminals V+ and V− are electrically connected to the current regulator 200. The current regulator 200 provides a fixed (constant) current to the LED module 190. For example, in one embodiment, the current regulator 200 may be implemented with a constant current sink. LED voltage V+ is converted to current by resistor R1 to provide base current to the transistor Q2 current amplifier. Error amplifier OA1 and transistor Q3 operate to maintain a fixed voltage across LED current limiting resistor R2. The inverting input 204 of OA1 is configured to receive voltage reference $V_{REF}$. The non-inverting input 202 of OA1 is configured to receive transistor Q2 emitter voltage $V_E$. Error voltage at the input 202 of OA1 will result in a corresponding increasing or decreasing current at the output terminal 206 of OA1 which drives the base of transistor Q3. Transistor Q3 will shunt more or less base current from Q2 to maintain a fixed voltage $V_E$ that is equal to reference voltage $V_{REF}$. Voltage $V_E$ across resistor R2 determines the LED current. Note that the current regulator 200 may be implemented in a variety of ways, and the constant current sink illustrated in FIG. 2 is only an example and not meant to limit the present disclosure.

The shutdown switch 180 is electrically connected to the LED module 190 cathode terminal K and the rectifier circuit 170 V− terminal. The voltage detection unit 182 monitors the voltage between the LED module 190 cathode terminal K and V−. The shutdown switch 180 is electrically connected to the base $V_B$ of transistor Q2. In the present disclosure, the switch Q1 is implemented with an N-type metal-oxide semiconductor (NMOS), in which the gate terminal of Q1 is connected to the voltage detection unit 182, the drain terminal of Q1 is connected to the base terminal of Q2 and the source terminal of Q1 is connected to the V− terminal of the rectifier circuit 170. The voltage detection unit 182 is configured to turn Q1 ON when the voltage at the LED module 190 cathode terminal K exceeds a predetermined level. This connects of base of Q2 to V− to turn Q2 OFF. This interrupts the current flow to the current regulator 200, protecting it in the event of an LED module 190 short circuit or excessive input voltage.

The invention claimed is:

1. A dimming circuit requiring not more than 2 wires, configured to dim a lighting module, comprising:
   one or a plurality of LED lamp(s) that are electrically connected to a single external LED driver;
   an over-voltage protection unit that prevents damage to components in an event of an over voltage condition;
   a rectifier circuit to convert AC to DC voltage signals to a correct polarity;
   a LED module electrically connected to the rectifier circuit and an input terminal of a current regulator;
   the current regulator is electrically connected to the LED module, with the rectifier circuit electrically connected to the current regulator;
   a shutdown switch is electrically connected to the LED module and the rectifier circuit;
   a voltage detection unit which monitors the voltage between LED module cathode terminals, with the shutdown switch electrically connected to a base of a transistor;
   the voltage detection unit is configured to turn the transistor on when the voltage at the LED module cathode terminal exceeds a predetermined level, which connects with a base of another transistor to turn it off;
   a driver that contains a power factor corrected, filtered and regulated DC power supply that provides power to control circuitry, as well as the lamps;
   a high dimming ratio to achieve deep dimming, which serves as a function of a PWM signal of the driver;
   a consistent brightness between adjacent lamps where the brightness of all lamps are controlled by the PWM signal; and
   a dimming angle sensing unit, which converts a reverse or forward AC mains phase-cut signal to an isolated low voltage control signal, such that third party phase-cut dimmers are allowed interchangeable use of this low voltage LED system.

2. The dimming circuit of claim 1, wherein the voltage detecting unit comprises:
   a voltage monitor between the LED module cathode terminals, wherein the shutdown switch is electrically connected to the base of the transistor, and the voltage detection unit is configured to turn a transistor on when the voltage at the LED module cathode terminal exceeds a predetermined level, which connects the base of another transistor to turn that transistor off.

3. The dimming circuit of claim 1, further comprising:
   an interruption to the current flow to the current regulator, protecting it in the event of an LED module short circuit or excessive input voltage.

4. A dimmable LED lamp or series of dimmable lamps comprising:
   a driver module; an LED lamp or plurality of LED lamps that is electrically connected to a single external LED driver;
   an over-voltage protection unit that prevents damage to components in an event of an over voltage condition;

a rectifier circuit to convert AC to DC voltage signals to a correct polarity;

an LED module electrically connected to the rectifier circuit and a current regulator input terminal;

a current regulator electrically connected to the LED module, with the rectifier circuit electrically connected to the current regulator;

a shutdown switch is electrically connected to the LED module and the rectifier circuit;

a voltage detection unit that monitors the voltage between LED module cathode terminals, with the shutdown switch electrically connected to a base of a transistor;

the voltage detection unit is configured to turn the transistor on when the voltage at the LED module cathode terminal exceeds a predetermined level, which connects with a base of another transistor to turn it off;

a driver that contains a power factor corrected, filtered and regulated DC power supply that provides power to control circuitry as well as the lamps;

a high dimming ratio to achieve deep dimming, which serves as a function of a PWM signal of the driver; and a consistent brightness between adjacent lamps where the brightness of all lamps are controlled by the PWM signal.

5. The dimmable LED lamp device of claim 4, wherein the external LED Driver is electrically connected to an AC power source, and contains an AC to DC converter, a control unit and a power switch.

6. The dimmable LED lamp device of claim 4, further comprising:

a receiving module electrically connected to a control unit, and configured to receive an external dimming signal and to output a control signal to the control unit according to an external dimming signal;

wherein the control unit is configured to adjust a duty cycle of the pulse width modulation signal according to the control signal to control a terminal voltage of the lighting module.

7. A dimming circuit requiring not more than 2 wires, configured to dim a lighting module, comprising:

one or a plurality of LED lamp(s) that are electrically connected to a single external LED driver;

an over-voltage protection unit that prevents damage to components in an event of an over voltage condition;

a rectifier circuit to produce voltage of the correct polarity usable by the LED module regardless of the input polarity;

a LED module electrically connected to the rectifier circuit and an input terminal of a current regulator;

a current regulator electrically connected to the LED module, with a rectifier circuit electrically connected to current regulator;

a shutdown switch is electrically connected to LED module and the rectifier circuit;

a voltage detection unit which monitors the voltage at the LED module cathode terminals, with the shutdown switch electrically connected to the current regulator;

a voltage detection circuit is electrically connected to a shutdown switch and LED module, and configured to monitor the voltage at a LED module cathode terminal;

wherein the shutdown switch is electrically connected to a current regulator, and configured to turn on when the voltage at the LED module cathode terminal exceeds a predetermined threshold for the purpose of interrupting current to the LED module;

a control unit electrically connected to a power switch configured to provide high resolution pulse width modulated power capable of extremely low duty cycles resulting in a high dimming ratio to achieve deep dimming of the LED lamps;

a consistent brightness between adjacent lamps where the brightness of all lamps are controlled by a PWM signal; and a dimming angle sensing unit, which converts a reverse or forward AC mains phase-cut signal to an isolated low voltage control signal, such that third party phase-cut dimmers interchangeable use of this low voltage LED system.

8. The dimming circuit of claim 7, wherein the voltage detecting unit comprises:

a voltage monitor at the LED module cathode terminal, wherein the shutdown switch is electrically connected to the voltage monitor circuit and a base of the series pass power transistor and in parallel with a shunting transistor which forms the feedback loop of the current regulator, where the switch is configured to turn on when the voltage at the LED module cathode terminal exceeds a predetermined level.

* * * * *